United States Patent
Larson (10) Patent No.: US 9,963,619 B2
(45) Date of Patent: May 8, 2018

(54) ELECTRICALLY CONDUCTIVE ADHESIVES, ASSEMBLIES INCLUDING THE ELECTRICALLY CONDUCTIVE ADHESIVES, AND RELATED METHODS

(71) Applicant: Orbital ATK, Inc., Dulles, VA (US)

(72) Inventor: Robert S. Larson, Harrisville, UT (US)

(73) Assignee: Orbital ATK, Inc., Plymouth, MN (US)

( * ) Notice: Subject to any disclaimer, the term of this patent is extended or adjusted under 35 U.S.C. 154(b) by 129 days.

(21) Appl. No.: 14/951,376

(22) Filed: Nov. 24, 2015

(65) Prior Publication Data

US 2017/0145264 A1 May 25, 2017

(51) Int. Cl.
| | | |
|---|---|---|
| C09J 9/02 | (2006.01) | |
| B32B 37/12 | (2006.01) | |
| C09J 163/00 | (2006.01) | |
| B32B 7/12 | (2006.01) | |
| H05K 1/02 | (2006.01) | |
| C09J 5/00 | (2006.01) | |

(52) U.S. Cl.
CPC .............. *C09J 9/02* (2013.01); *B32B 7/12* (2013.01); *B32B 37/12* (2013.01); *C09J 5/00* (2013.01); *C09J 163/00* (2013.01); *H05K 1/0296* (2013.01); *B32B 2250/02* (2013.01); *B32B 2255/26* (2013.01); *B32B 2307/202* (2013.01); *B32B 2307/304* (2013.01); *B32B 2457/00* (2013.01); *B32B 2605/18* (2013.01); *C09J 2463/00* (2013.01)

(58) Field of Classification Search
None
See application file for complete search history.

(56) References Cited

U.S. PATENT DOCUMENTS

| | | | | |
|---|---|---|---|---|
| 3,825,999 | A | * | 7/1974 | Rubey .................... H05K 3/222 174/254 |
| 4,822,832 | A | * | 4/1989 | Chu ........................ C08G 59/50 428/209 |
| 5,609,315 | A | | 3/1997 | Lepore, Jr. |
| 6,083,615 | A | | 7/2000 | Long et al. |
| 6,472,601 | B2 | | 10/2002 | Hunn et al. |
| 7,864,501 | B2 | | 1/2011 | Rawlings et al. |
| 7,947,773 | B2 | | 5/2011 | Hansen et al. |
| 8,196,045 | B2 | | 6/2012 | Chandratillake et al. |
| 8,772,391 | B2 | | 7/2014 | Sang et al. |
| 8,840,813 | B2 | | 9/2014 | Aspin et al. |
| 8,963,022 | B2 | | 2/2015 | Hansen et al. |
| 2009/0117269 | A1 | * | 5/2009 | Hansen .................... B29C 70/14 427/212 |
| 2012/0301708 | A1 | | 11/2012 | Dagras et al. |
| 2015/0174860 | A1 | | 6/2015 | Ellis et al. |
| 2015/0340120 | A1 | * | 11/2015 | Ishizawa ................ C08G 59/40 361/760 |

FOREIGN PATENT DOCUMENTS

| | | | |
|---|---|---|---|
| JP | 2016-066614 | * | 4/2016 |
| WO | 9623837 A2 | | 8/1996 |

OTHER PUBLICATIONS

Hansen et al. Investigation of Electrically Conductive Structural Adhesives using Nickel Nanostrands. Journal of Adhesion Science and Technology 25 (2011) 2659-2670.*
Szatkowski et al. "Electrical Characterizations of Lightning Strike Protection Techniques for Composite Materials", 4 pages.
Goodloe, "Lightning Protection Guidelines for Aeorospace Vehicles", Technical Memorandum for National Aeronautics and Space Administration; (May 1999); pp. 1-48.
Nanostrand datasheet; Conductive Composites Enabling Conductivity; info@conductiveomposites.com; pp. 1-2.
Gabrielson, Bruce C. "Lightning Protection for Rockets" Article (1982) pp. 1-197.
Sliver Coated Hollow Ceramic—AGS150-30TRD.
Mielke, Ernest W. "Silver Filled Conductive Epoxies" NASA Materials Engineering Branch, Technical Information Paper (First Issued: Jun. 1986, Revised Oct. 2002) pp. 1-2.
Spacecraft Design Guidelines Chapter 3; pp. 1-42.

* cited by examiner

*Primary Examiner* — Tanisha Diggs
(74) *Attorney, Agent, or Firm* — TraskBritt (57) ABSTRACT

An assembly comprising a first article, a second article adjacent the first article, and an electrically conductive adhesive in electrical communication with the first article and the second article. The electrically conductive adhesive comprises nickel nanostrands dispersed in a matrix comprising a reaction product of bisphenol-F epoxy resin, resorcinol diglycidyl ether epoxy monomer, and at least one amine-containing curing agent. The electrically conductive adhesive exhibits a tensile adhesion strength greater than about 5,000 psi and a volume resistivity less than about 0.01 $\Omega \cdot cm$. Electrically conductive adhesives including nickel nanostrands, precursor packages of the electrically conductive adhesive, related methods of forming the electrically conductive adhesive and an assembly including the electrically conductive adhesive are also disclosed.

24 Claims, 4 Drawing Sheets

ELECTRICALLY CONDUCTIVE ADHESIVES, ASSEMBLIES INCLUDING THE ELECTRICALLY CONDUCTIVE ADHESIVES, AND RELATED METHODS

TECHNICAL FIELD

Embodiments of the disclosure relate generally to electrically conductive adhesives including nickel nanostrands, assemblies such as space vehicles including the electrically conductive adhesives, and to related methods.

BACKGROUND

Space vehicles, such as space shuttles, rockets, satellites, missiles, etc., may be exposed to hostile conditions characterized by high temperatures and turbulence during flight (e.g., launch, ascent, re-entry, etc.). Such space vehicles are formed of multiple components secured together or in adjacent relationship, and may require both thermal protection systems and electrical protection systems to protect the space vehicle from damage that may be caused during flight.

For example, a space vehicle may be exposed to extreme temperatures such as exhaust plumes, heat generated by atmospheric friction during launch and re-entry, etc. Excessive heat may damage one or more portions of the space vehicle, including, for example, wings, nozzles, a nose cone, fuel tanks, engine exhaust ducts, re-entry shield surfaces, etc. Accordingly, space vehicles are often equipped with a thermal protection system (TPS), which may be incorporated in one or more parts of the space vehicle that are exposed to high temperatures or large temperature gradients. A TPS conventionally employs assemblies in the form of a multi-component structure comprising a plurality of insulative panels or tiles attached to the surface of a structure or member that is intended to be protected by the TPS, such as on outer surfaces of a re-usable space shuttle used by NASA. Conventional composite materials may include reinforced carbon-carbon (RCC), fibrous refractory composite insulation tiles (FRCI), ceramic matrix composites (CMCs), etc. Such thermally insulative materials are designed and configured to protect the space vehicle frame from temperatures encountered during flight, such as re-entry into Earth's atmosphere (which temperatures may exceed about 1,260° C.).

In addition to thermal protection systems, space vehicles conventionally include one or more systems to protect the space vehicle from direct and indirect lightning strikes (lightning strike protection (LSP) systems), electrostatic discharge (ESD), or electromagnetic interference (EMI). For example, a lightning strike protection system may provide a relatively low electrical resistance pathway from a location of a lightning strike to a location where electric charge from the lightning strike can dissipate, to reduce or prevent damage to the spacecraft. In addition, charges may build up on surfaces of the space vehicle over time (such as by triboelectrification), eventually resulting in ESD. The ability to effectively manage lightning strikes and ESD on composite materials that form structural components of space vehicles is a significant safety consideration for the space vehicles.

Conventional thermal protection systems, which include materials that are disposed on exterior surfaces of the space vehicle, often include electrically insulative composite materials. Thus, in some instances, the space vehicle may include an electrically conductive film on exterior surfaces of the space vehicle, or multi-layered composites that include conductive meshes or foil layers to dissipate charge from lightning strikes or ESD. However, some foils may be expensive and prone to mechanical failure. Further, high currents from lightning strikes or ESD may damage sites of electrical discontinuity where the current may arc, such as at locations between composite panels, mechanical fasteners, joints, fiber interfaces, etc. Electrically conductive adhesives disposed between adjacent panels may include a large volume of silver filler materials to provide electrical conductivity to the conductive adhesive. However, the large volume of silver required for sufficient electrical conductivity reduces an adhesion strength of the adhesive and, thus, materials adjoined by the adhesive may debond in the event of a lightning strike or ESD. Further, the large volume of silver may also be cost prohibitive in many applications.

BRIEF SUMMARY

Embodiments disclosed herein include electrically conductive adhesives, assemblies including the electrically conductive adhesives, as well as related methods. For example, in accordance with one embodiment, an assembly comprises a first article, a second article adjacent the first article, and an electrically conductive adhesive comprising nickel nanostrands dispersed in a matrix comprising a reaction product of bisphenol-F epoxy resin, resorcinol diglycidyl ether epoxy monomer, and at least one amine-containing curing agent in electrical communication with the first article and the second article, wherein the electrically conductive adhesive exhibits a tensile adhesion strength greater than about 5,000 psi and a volume resistivity less than about 0.01 Ω·cm.

In additional embodiments, an electrically conductive adhesive comprises between about two volume percent and about fifteen volume percent nickel nanostrands dispersed within an adhesive matrix material, the adhesive matrix material comprising a reaction product of bisphenol-F epoxy resin and resorcinol diglycidyl ether epoxy monomer and at least one amine curing agent. The electrically conductive adhesive exhibits a tensile strength greater than about 5,000 psi and a volume resistivity less than about 0.01 Ω·cm.

In further embodiments, a method of forming an assembly comprises providing at least a first article and at least a second article, and disposing an electrically conductive adhesive comprising nickel nanostrands and exhibiting a tensile adhesion strength greater than about 5,000 psi and a volume resistivity less than about 0.01 Ω·cm between a surface of the first article and a surface of the second article to electrically interconnect the first article and the second article.

In yet additional embodiments, a precursor package for forming an electrically conductive adhesive exhibiting a tensile adhesion strength greater than about 5,000 psi and a volume resistivity less than about 0.01 Ω·cm when mixed comprises a first part comprising a mixture of bisphenol-F epoxy resin and resorcinol diglycidyl ether epoxy monomer, a second part comprising an amine-terminated curing agent, and nickel nanostrands dispersed in at least one of the first part and the second part.

DETAILED DESCRIPTION

Illustrations presented herein are not meant to be actual views of any particular material, component, or system, but are merely idealized representations that are employed to describe embodiments of the disclosure. Additionally, elements common between figures may retain the same numerical designation for convenience and clarity.

The following description provides specific details, such as material types, compositions, material thicknesses, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional techniques employed in the industry. In addition, the description provided below does not form a complete process flow for forming an electrically conductive adhesive or a space vehicle including an electrically conductive adhesive. Only those process acts and structures necessary to understand the embodiments of the disclosure are described in detail below. Additional acts or materials to form an electrically conductive adhesive or a space vehicle including the electrically conductive adhesive may be performed by conventional techniques.

Electrically conductive adhesives may be used to provide electrical continuity between electrical components or electrically conductive portions of one or more materials. For example, an electrically conductive adhesive may be disposed between portions of, for example, space vehicles (e.g., space shuttles, space launch systems (SLSs), launch abort systems (LASs), satellites, rocket motors, fuel tanks, solid rocket boosters, etc.), aerospace vehicles, aircraft, or other assemblies or structures in which electrical continuity between adjacent components or articles is desired. As used herein, a structure may include, without limitation, a space vehicle, an aerospace vehicle, or aircraft, or other assembly or material to which electrical continuity is desired. The electrically conductive adhesive may include nickel nanostrands dispersed within one of an epoxy-based adhesive or a urethane-based adhesive. The electrically conductive adhesive may include between about 2 volume percent and about 15 volume percent of the nickel nanostrands. The electrically conductive adhesive may exhibit an improved electrical conductivity, improved adhesion strength (e.g., tensile adhesion strength), and lower density, compared to conventional electrically conductive adhesives. The electrically conductive adhesives may be used in any of a number of structures to provide electrical continuity between, for example, components of a lightning strike protection system, ESD protection system, or for EMI shielding applications. In some embodiments, the electrically conductive adhesive is disposed between composite materials that are part of a thermal protection system.

The electrically conductive adhesive may include nickel nanostrands dispersed within an adhesive matrix material. The nickel nanostrands may impart electrical conductivity to an otherwise electrically insulative adhesive matrix material. The nickel nanostrands may comprise dendritic nickel fiber bundles, which may also be referred to herein as "nanostrands." As used herein, a nanostrand includes a material that is highly branched and exhibits a high aspect ratio. A nanostrand may include a central portion and several branches extending from the central portion, each of which may be irregular and may form interconnections with other branches or other nanostrands to form a complex three-dimensional network as described in U.S. Pat. No. 7,947,773, the entire disclosure of which is hereby incorporated herein in its entirety by this reference. Thus, the branches of the nickel nanostrands may intersect, forming interconnected conductive pathways imparting electrical conductivity to the electrically conductive adhesive material.

The central portion of the nickel nanostrands may be cylindrical or rod shaped and may have a diameter between about 100 nm and about 3,000 nm, such as between about 100 nm and about 500 nm, between about 500 nm and about 1,000 nm, or between about 1,000 nm and about 3,000 nm. The branches may have varying diameters ranging between about 100 nm and about 1,000 nm, such as between about 100 nm and about 300 nm, between about 300 nm and about 600 nm, or between about 600 nm and about 1,000 nm. In some embodiments, the branches have a diameter between about 150 nm and about 300 nm.

The nickel nanostrands may have a density of between about 0.1 g/cm$^3$ and about 0.3 g/cm$^3$, such as between about 0.1 g/cm$^3$ and about 0.15 g/cm$^3$, between about 0.15 g/cm$^3$ and about 0.20 g/cm$^3$, between about 0.20 g/cm$^3$ and about 0.25 g/cm$^3$, or between about 0.25 g/cm$^3$ and about 0.30 cm$^3$. The nickel nanostrands may have an average surface area of about 1 m$^2$/g and about 5 m$^2$/g, such as between about 1 m$^2$/g and about 3 m$^2$/g, or between about 3 m$^2$/g and about 5 m$^2$/g.

The nickel nanostrands may constitute between about 1 volume percent and about 20 volume percent of the electrically conductive adhesive, such as between about 1 volume percent and about 5 volume percent, between about 5 volume percent and about 10 volume percent, between about 10 volume percent and about 15 volume percent, or between about 15 volume percent and about 20 volume percent of the electrically conductive adhesive. In some embodiments, an increasing volume percent of the nickel nanostrands in the electrically conductive adhesive may increase an electrical conductivity of the electrically conductive adhesive. A weight percent of the nickel nanostrands in the electrically conductive adhesive may be between about 10 weight percent and about 70 weight percent, such as between about 10 weight percent and about 30 weight percent, between about 30 weight percent and about 50 weight percent, or between about 50 weight percent and about 70 weight percent.

The electrically conductive adhesive may include one or more conductive fillers in addition to the electrically conductive nickel nanostrands. In some embodiments, the additional conductive filler may reduce an overall density of the resulting electrically conductive adhesive. The additional conductive filler may include, for example, silver-coated microspheres, nickel-coated microspheres, silver-plated alu- minum, nickel-coated graphite, silver-plated copper, silver-plated nickel, other suitable electrically conductive filler material, or combinations thereof. In some embodiments, the additional conductive filler includes silver-coated ceramic spheres, such as AGSL150-30TRD, or silver-coated glass spheres, such as S2429-S or SH230S33, or a combination of silver-coated ceramic spheres and silver-coated glass spheres, each sold under the trade name CONDUCT-O-FIL® and commercially available from Potters Industries, LLC of Malvern, PA.

The additional conductive filler may constitute between about 0 volume percent and about 70 volume percent of the electrically conductive adhesive, such as between about 0 volume percent and about 5 volume percent, between about 5 volume percent and about 15 volume percent, between about 15 volume percent and about 40 volume percent, or between about 40 volume percent and about 70 volume percent of the electrically conductive adhesive. In some embodiments, the additional conductive filler constitutes about 15 volume percent of the electrically conductive adhesive.

The one or more additional conductive fillers may be spherical and may have an average size (e.g., diameter) of about 10 μm and about 100 such as between about 10 μm and about 25 μm, between about 25 μm and about 50 μm, or between about 50 μm and about 100 μm. In some embodiments, the additional conductive filler has a diameter of about 100 μm. In other embodiments, the one or more additional conductive fillers may be cylindrical, platelet, flakes, fibers, or a combination thereof.

The adhesive matrix material may be an epoxy resin, a urethane resin, or other suitable adhesive matrix material in which the nickel nanostrands may be dispersed. In some embodiments, the adhesive matrix material comprises an epoxy. The epoxy may comprise a reaction product of monomeric bisphenol-F epoxy resin and resorcinol diglycidyl ether epoxy resin.

The bisphenol-F epoxy resin may comprise a diglycidyl ether of monomeric bisphenol-F epoxy, sold under the trade name EPON™ Resin 862, commercially available from Hexion, of Columbus, Ohio, and having the structure shown below:

The diglycidyl ether of monomeric bisphenol-F epoxy may exhibit a low viscosity (e.g., between about 2500 cp and about 4,500 cp at 25° C.) and may have an epoxide equivalent weight (i.e., a weight of resin containing one mole equivalent epoxide) of between about 165 g and about 173 g.

In some embodiments, the resorcinol diglycidyl ether epoxy resin may comprise a monomer including two epoxide groups, such as ERISYS® RDGE-H, commercially available from Emerald Performance Materials, LLC of Cuyahoga Falls, Ohio. The resorcinol diglycidyl ether epoxy resin may have the general formula $C_6H_4(OCH_2CHCHO)_2$. In embodiments, where the resorcinol diglycidyl ether epoxy resin comprises a monomer, the resorcinol exhibits a substantially low viscosity (e.g., between about 200 and about 325 cps at about 25° C.) and a substantially high reactivity with the bisphenol-F epoxy resin. The resorcinol diglycidyl ether epoxy may be selected to reduce a viscosity of a mixture of the resorcinol diglycidyl ether epoxy and the bisphenol-F epoxy. The resorcinol diglycidyl ether epoxy may exhibit an epoxide equivalent weight of between about 115 g and about 122 g. The resorcinol diglycidyl ether epoxy may have the structure shown below:

The epoxy adhesive may further include one or more curing agents formulated and configured to cure the electrically conductive adhesive. The curing agent may include an amine. In some embodiments, the curing agent may include an amine terminated poly(propylene glycol) polymer, such as a polyetheramine, as shown below:

wherein n is equal to about 2.5 or about 6.1, or a combination thereof. In some embodiments, the polyetheramines are sold under the tradename JEFFAMINE®, such as JEFFAMINE® D400 (wherein n is equal to about 6.1) or JEFFAMINE® D230 (wherein n is equal to about 2.5) commercially available from Huntsman Corporation of The Woodlands, Tex. In some embodiments, the electrically conductive adhesive includes about 1 part by weight of JEFFAMINE® D400 for every about 2 parts by weight of JEFFAMINE® D230.

A weight ratio of the resorcinol diglycidyl ether epoxy resin to the bisphenol-F epoxy resin may be between about 1:1 and about 1:5, such as between about 1:1 and about 1:2, between about 1:2 and about 1:3, or between about 1:3 and about 1:5. In other words, for every 1 part by weight of the resorcinol diglycidyl ether epoxy resin, the electrically conductive adhesive may include between about 1 and about 5 parts by weight bisphenol-F epoxy resin. In some embodiments, for every about 3 parts by weight of resorcinol diglycidyl ether epoxy resin, the electrically conductive adhesive includes about 7 parts by weight of the bisphenol-F epoxy resin.

The bisphenol-F epoxy resin and the resorcinol diglycidyl ether epoxy resin may be substantially reactive and may react to form a cured epoxy adhesive. In some embodiments, the epoxy material is crosslinked with the curing agent, as illustrated in the structure below:

In some embodiments, the epoxy further includes a curing promoter, such as ACCELERATOR® 399, commercially available from Huntsman Corporation of The Woodlands, Tex. The electrically conductive adhesive may include about 1 part by weight of the curing promoter for every about 8 to about 10 parts by weight of the curing agent.

In yet other embodiments, the adhesive matrix material may comprise a urethane adhesive. In some such embodiments, the urethane matrix material may be a two-part urethane formed from one or more polyols and a diisocyanate.

The one or more polyols may include a butane diol (e.g., 1,4-butane diol), a triol such as a polypropylene glycol (PPG) triol, or a combination thereof. In some embodiments, the triol comprises JEFFOL® G30-650, commercially available from Huntsman Corporation of The Woodlands, Tex. The triol may have a molecular weight of about 260 and an equivalent weight of about 86. In some embodiments, the polyol includes a combination of 1,4-butane diol and the triol. By way of nonlimiting example, the polyol may include about 1 part by weight of the 1,4-butane diol for every about 2 parts by weight of the polypropylene glycol triol.

The diisocyanate may include a dimer fatty acid based diisocyanate, such as dimeryl diisocyanate (DDI) (e.g., $C_{38}H_{70}N_2O_2$) sold under the trade name DDI-1410, commercially available from BASF, of Ludwigshafen, Germany. In other embodiments, the diisocyanate may include, for example, methyl diphenyl diisocyanate (MDI) ($C_{15}H_{10}N_2O_2$), isophorone diisocyanate (IPDI) ($C_{12}H_{18}N_2O_2$), or a combination thereof.

A catalyst may be added to the polyol and the diisocyanate to increase a reaction rate between the polyol and the diisocyanate. The catalyst may include dibutyltin dilaurate (DBTDL).

The urethane may comprise a reaction product of the polyols with the diisocyanates. For example, in some embodiments, the urethane comprises a reaction product of 1,4-butane diol, a triol, and DDI. The urethane may include about 1 part of the polyol for every about 4 parts of the diisocyanate or for every about five parts of the diisocyanate.

Figure 1:
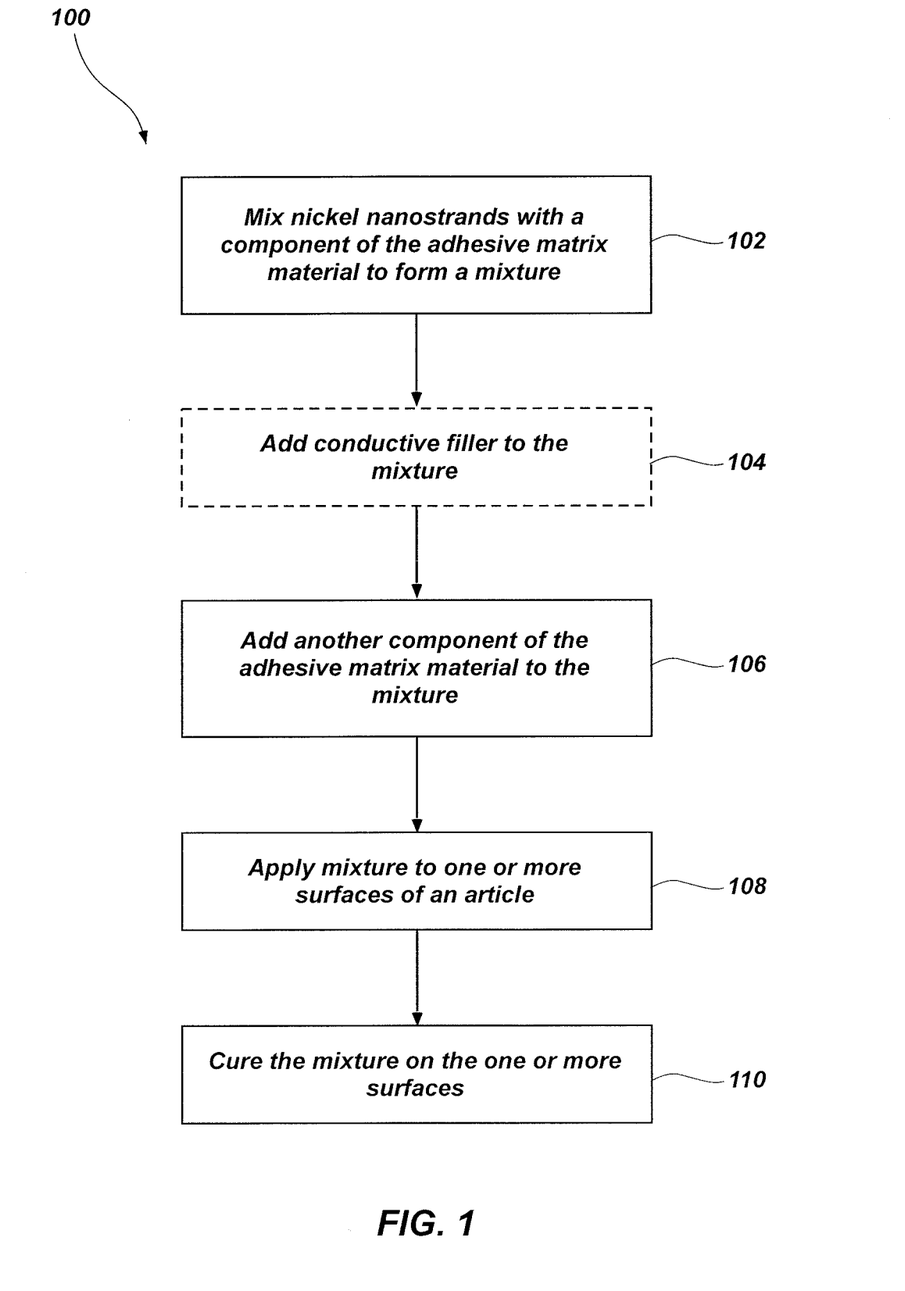
FIG. 1 is a flow chart illustrating a method of forming an electrically conductive adhesive on at least one surface of an article, according to an embodiment of the disclosure.

FIG. 1 is a simplified flow chart illustrating a method 100 of forming the electrically conductive adhesive in accordance with embodiments of the disclosure. The method 100 includes a mixing process 102 including mixing nickel nanostrands with at least one component of the adhesive matrix material to form a mixture; an optional conductive filler addition process 104 including adding one or more conductive fillers to the mixture in addition to the nickel nanostrands already present in the mixture; a reaction process 106 including adding at least another component of the adhesive matrix material to the mixture to form the electrically conductive adhesive; an application process 108 including applying the electrically conductive adhesive onto one or more surfaces of an article; and a curing process 110 including curing the electrically conductive adhesive on the one or more surfaces of the article to form an electrical connection between the electrically conductive adhesive and the one or more surfaces of the article.

The mixing process 102 may include mixing at least one component of the adhesive matrix material (e.g., one of the bisphenol-F epoxy resin or the resorcinol diglycidyl ether epoxy resin where the adhesive is an epoxy material or one of the polyol or the isocyanate where the adhesive is a urethane material) with nickel nanostrands to form a mixture of the nickel nanostrands dispersed within the at least one component of the adhesive matrix material. In some embodiments, a mixer may be configured to disperse the nickel nanostrands within the at least one component without damaging the dendritic structure of the nickel nanostrands.

The conductive filler addition process 104 includes dispersing one or more additional conductive filler materials within the mixture. In some embodiments, the one or more additional electrically conductive fillers may enhance processing of the electrically conductive adhesive and may enhance mixing of the nickel nanostrands within the mixture.

The reaction process 106 includes adding at least another component of the adhesive matrix material to the mixture to form the electrically conductive adhesive. The reaction process 106 may further include adding one or more curing agents, curing promoters, or catalysts to the mixture.

The application process 108 may include applying the electrically conductive adhesive to one or more surfaces of an article to which electrical continuity is desired. The article may include, for example, one or more of a composite panel in a thermal protection system, a bond pad used to bond adjacent panels, a ground strip in a lightning protection system or an ESD protection system, or other surface or area where electrical continuity is desired between adjacent materials. In some embodiments, the electrically conductive adhesive is applied to a bond line thickness between about 7 mils (0.007 inch) and about 30 mils (0.030 inch).

The curing process 110 includes allowing the electrically conductive adhesive to harden. In some embodiments, the adhesive material may cure after about 48 hours when exposed to a temperature of about 25° C. or after about 12 hours when exposed to a temperature of about 80° C. Surfaces including the electrically conductive adhesive may be pressed together while the electrically conductive adhesive cures.

The electrically conductive adhesive may exhibit a higher tensile adhesion (TA) strength than a conventional electrically conductive adhesive. In some embodiments, the electrically conductive adhesive exhibits a tensile adhesion strength greater than about 3,000 psi, such as greater than about 4,000 psi, greater than about 5,000 psi, greater than about 6,000 psi, greater than about 7,000 psi, or greater than about 8,000 psi, as measured by, for example, a tensile butt test, as known in the art.

The electrically conductive adhesive may exhibit a volume resistivity less than about 0.25 Ω·cm, such as less than about 0.20 Ω·cm, less than about 0.15 Ω·cm, less than about 0.10 Ω·cm, less than about 0.05 Ω·cm, less than about 0.01 Ω·cm, or less than about 0.005 Ω·cm, as determined by ASTM D-2739 Standard Test Method for Volume Resistivity of Conductive Adhesives.

The electrically conductive adhesive may exhibit a lower density than commercially available electrically conductive adhesives. For example, the electrically conductive adhesive may exhibit a density of about 2.2 g/cm$^3$, while some commercially available electrically conductive adhesives including, for example, silver filler materials, have a density between about 3.3 g/cm$^3$ and about 3.6 g/cm$^3$. The density of the electrically conductive adhesive including nickel nanostrands may be between about 2.0 g/cm$^3$ and about 3.0 g/cm$^3$, such as between about 2.0 g/cm$^3$ and about 2.2 g/cm$^3$, between about 2.2 g/cm$^3$ and about 2.5 g/cm$^3$, or between about 2.5 g/cm$^3$ and about 3.0 g/cm$^3$. In some embodiments, the electrically conductive adhesive exhibits a density less than about 2.5 g/cm$^3$, such as less than about 2.2 g/cm$^3$.

Without wishing to be bound by any particular theory, it is believed that the nickel nanostrands impart electrical conductivity to the electrically conductive adhesive while the electrically conductive adhesive exhibits a substantially higher tensile adhesion strength than conventional electrically conductive adhesives because the nickel nanostrands may be loaded into the electrically conductive adhesive at a lower volume percent than other electrically conductive additives while still exhibiting a substantially high electrical conductivity due to the morphology and branching of the nickel nanostrands within the adhesive. At the lower volume percent of nickel nanostrands used for the electrical conductivity of the electrically conductive adhesive, the adhesive properties of the epoxy or urethane matrix material of the adhesive are better preserved and the resulting electrically conductive adhesive exhibits a substantially high tensile adhesion strength.

The electrically conductive adhesive may comprise a part of a lightning strike protection system, an ESD protection system, or an EMI shielding system for a structure, such as, for example, a space vehicle. For example, during operation, static charges may accumulate on surfaces of the space vehicle (e.g., insulation materials, a rocket casing, etc.). Without sufficient electrical continuity between components of the space vehicle, the accumulated charges may electrostatically discharge. Similarly, if a charge from a lightning strike is not sufficiently dissipated, the charge may damage or even destroy at least a portion of the space vehicle. Accordingly, the electrically conductive adhesive may form at least a part of a low electrical resistance conductive pathway for such charges to dissipate and may be used to provide electrical continuity between at least some, if not all, structural parts, electronic boxes, enclosures, etc., of a space vehicle. In other embodiments, the electrically conductive adhesive may form a part of an EMI shielding system (e.g., a EMI box) to protect sensitive electronic components from electromagnetic interference.

Figure 2:
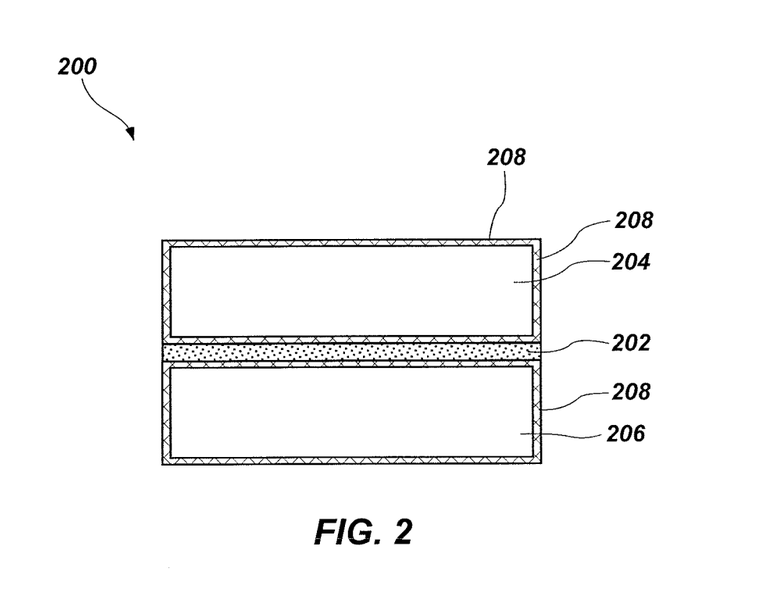
FIG. 2 is a simplified cross-sectional view of an electrically conductive adhesive disposed between surfaces of adjacent articles, according to an embodiment of the disclosure.

FIG. 2 illustrates an article 200 in the form of an assembly including an electrically conductive adhesive 202 disposed between a first component 204 and a second component 206. The article 200 may comprises at least a part of a lightning strike protection system, an ESD protection system, a thermal protection system, a part of an EMI shielding system, a shear ply layer (e.g., for coupling a rocket motor casing to a rocket skirt), or other component of a structure.

The electrically conductive adhesive 202 may be disposed on at least some surfaces of the first component 204 and the second component 206, such as directly between the first component 204 and the second component 206. The electrically conductive adhesive 202 may electrically connect the first component 204 to the second component 206.

The first component 204 and the second component 206 may each include an electrically insulative material, such as an electrically insulative composite material or a multi-layer insulation (MLI) blanket, and may be in the form of a panel or tile. In other embodiments, at least one of the first component 204 and the second component 206 may include an electrically conductive material. By way of nonlimiting example, at least one of the first component 204 and the second component 206 may include an electrically conductive material (e.g., an electrically conductive mesh, conductive fibers, etc.) disposed within a thermally insulative material (e.g., a composite material, cured ethylene-propylene-diene monomer (EPDM) terpolymer, phenolic resins, epoxy resins, high temperature melamine-formaldehyde coatings, ceramics, polyester resins, etc.). In other embodiments, at least one of the first component 204 and the second component 206 comprises a ground strip for electrically grounding at least the other of the first component 204 and the second component 206 to an electrically grounded portion of the space vehicle.

In some embodiments, each of the first component 204 and the second component 206 may be wrapped with an electrically conductive material 208. The electrically conductive material 208 may include, for example, a conductive paint, a conductive nonwoven material (e.g., a nickel nonwoven material), a conductive mesh (e.g., a conductive metallic mesh), or other conductive material.

In some embodiments, the electrically conductive adhesive 202 may be used to repair damage or discontinuities in the electrically conductive material 208 of a re-usable space vehicle. By way of nonlimiting example, electrically conductive material 208 may become damaged during launch, re-entry, or during flight. The electrically conductive material 208 may be replaced with a repair patch of, for example, a conductive mesh or a conductive nonwoven material. The repair patch may be secured to the damaged electrically conductive material 208 with the electrically conductive adhesive 202 and the electrically conductive material 208 may be in electrical communication with the repair patch through the electrically conductive adhesive.

Figure 3:
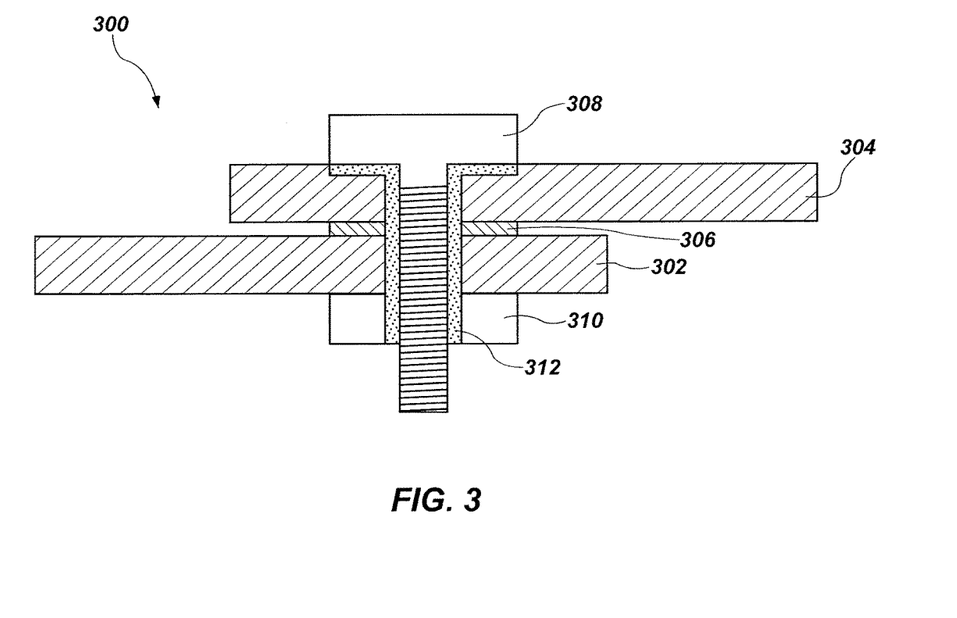
FIG. 3 is a simplified cross-sectional view of a fastener system including the electrically conductive adhesive, according to an embodiment of the disclosure.

FIG. 3 is a simplified cross-sectional view of a fastener assembly 300 including the electrically conductive adhesive. The fastener assembly 300 may be used to adjoin a first article 302 to a second article 304, which may be substantially similar to the first component 204 and the second component 206 described above with reference to FIG. 2. In some embodiments, a spacer 306 is disposed between the first article 302 and the second article 304. The first article 302 may be secured to the second article 304 with, for example, a bolt 308 and a nut 310, although the fastener assembly 300 may include other materials for fastening the first article 302 to the second article 304 (e.g., a clevis). An electrically conductive adhesive 312 may be disposed between the bolt 308 and each of the first article 302 and the second article 304, between the bolt 308 and the nut 310, or a combination thereof. In some embodiments, at least one of the first article 302 and the second article 304 comprises a ground strip. In some such embodiments, the ground strip may be in electrical communication with one of a composite panel or a MLI blanket at least through the electrically conductive adhesive 312.

Figure 4:
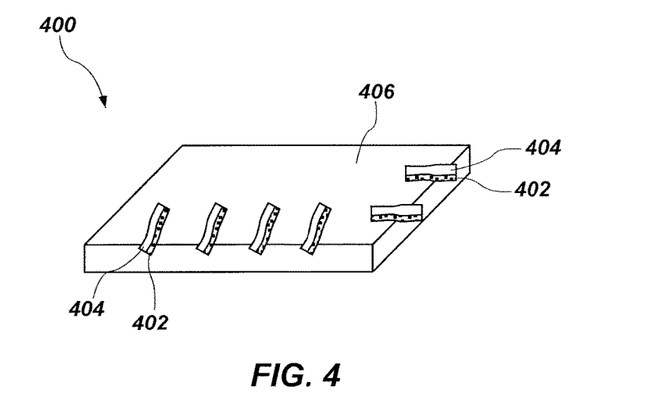
FIG. 4 is a simplified schematic of an assembly including bond pads attached to a panel with the electrically conductive adhesive, according to an embodiment of the disclosure.

FIG. 4 illustrates an assembly 400 including an electrically conductive adhesive 402 electrically connecting one or more bond straps 404 to a panel 406 that may form a part of a space vehicle. The panel 406 may be substantially similar to the first component 204, the second component 206, the first article 302, or the second article 304 described above with reference to FIG. 2 and FIG. 3. For example, the panel 406 may include a composite material, a MLI blanket, or other component of a space vehicle. At least a portion of each bond strap 404 may be attached to at least a portion of the panel 406 (e.g., at edges of the panel 406) with the electrically conductive adhesive 402. At least another portion of each bond strap 404 may be in electrical communication with another material of the assembly 400, such as another panel 406, via the electrically conductive adhesive 402. Accordingly, the bond straps 404 and the electrically conductive adhesive 402 may electrically connect a plurality of panels 406 to form a system of individual components that are electrically grounded to each other (e.g., a thermal protection system that may include, for example, MLI blankets, composite structures, a rocket casing, etc.). Although FIG. 4 illustrates a plurality of bond straps 404 on the panel 406, in other embodiments, adjacent panels 406 may be in electrical communication through only one bond strap 404 including the electrically conductive adhesive 402.

Figure 5:
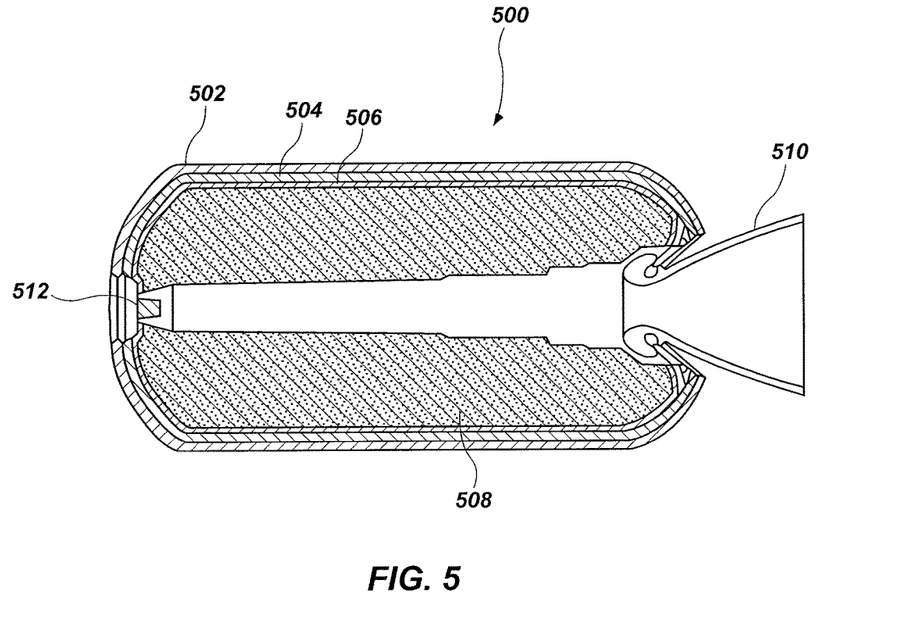
FIG. 5 is a simplified cross-sectional view of a rocket motor including one or more components that may incorporate the electrically conductive adhesive, according to an embodiment of the disclosure.

FIG. 5 illustrates a rocket motor 500 that may include the electrically conductive adhesive. The rocket motor 500 may include an assembly comprising a casing 502, an insulation material 504, a liner 506, and an energetic material 508 (e.g., a solid propellant such as a double-base propellant, an HTPB-based propellant, etc.). The casing 502 may include a metal, a composite material, or a combination of metal and composite materials. During operation, the insulation material 504 may protect the rocket motor casing 502 from thermal and erosive effects of particle streams generated from combustion of the energetic material 508. The insulation material 504 may further be disposed on surfaces of a nozzle assembly 510 to protect the nozzle assembly 510 from hot exhaust gases. The liner 506 bonds the insulation material 504 to the energetic material 508. The rocket motor 500 may further include an igniter 512 that may be activated to ignite the energetic material 508.

The casing 502 and the insulation material 504 may each include tiles or panels of a thermally insulative material, or MLI blankets. In some embodiments, the thermally insulative materials may be in electrical communication with each other through the electrically conductive adhesive, as described above with reference to FIG. 2 through FIG. 4. For example, adjacent tiles or panels may be secured and electrically grounded to each other by disposing the electrically conductive adhesive directly between adjacent panels, attaching the panels to each other with bond straps including the electrically conductive adhesive, attaching the panels to each other with a fastener assembly including the electrically conductive adhesive, or a combination thereof.

In other embodiments, the electrically conductive adhesive may comprise a part of an electromagnetic shielding system, such as an EMI box. The EMI box may include one or more metals that substantially shields a volume at least partially surrounded by the electromagnetic shielding system from electromagnetic radiation and may include, for example, aluminum, gold, silver, nickel, or a combination thereof. The electrically conductive adhesive may bond sides of the EMI box together, seal a door of the EMI box, may be disposed between joints of the EMI box, or a combination thereof. In other embodiments, the electrically conductive adhesive is applied to exterior surfaces of components, for example, surfaces of electronic enclosures, electrical cables, wiring, attitude control packages, transmitters and receivers, and other avionics to shield such systems from electromagnetic interference. In some embodiments, the electrically conductive adhesive used in EMI shielding applications includes a urethane adhesive matrix material.

In some embodiments, the electrically conductive adhesive may be provided as a precursor package (e.g., a kit, a premix, etc.) including precursors to the electrically conductive adhesive that, when mixed together, form the electrically conductive adhesive including nickel nanostrands dispersed therein. By way of nonlimiting example, the precursor package may include at least a first part and at least a second part formulated to form one of an epoxy resin adhesive matrix material or a urethane resin adhesive matrix material when mixed together.

In some embodiments, the first part may include an epoxy resin mixture (e.g., Part A of the two part epoxy compound) and the second part may include a curing agent (e.g., Part B of the two part epoxy compound). The epoxy resin mixture may include, for example, bisphenol-F and resorcinol diglycidyl ether epoxy monomer. In some embodiments, the first part may include about 7 parts by weight of the bisphenol-F epoxy resin for every about 3 parts of the resorcinol diglycidyl ether epoxy monomer.

The curing agent may include an amine, such as an amine-terminated poly(propylene glycol) polymer. The second part may further include at least one curing promoter. The second part may include about 1 part by weight of the curing promoter for every about 8 to about 10 parts by weight of the curing agent.

In other embodiments, the first part includes at least one polyol, such as butane diol (e.g., 1,4-butane diol), a triol such as a polypropylene glycol (PPG) triol, or a combination thereof. In some such embodiments, the second part may include a diisocyanate, such as DDI, methyl diphenyl diisocyanate, isophorone diisocyanate, or combinations thereof. At least one of the first part and the second part may further include a catalyst, such as dibutyltin dilaurate.

At least one of the first part and the second part may include nickel nanostrands dispersed therein. In some embodiments, substantially all of the nickel nanostrands that make up the electrically conductive adhesive are dispersed in one of the first part or the second part. In other embodiments, a portion of the nickel nanostrands may be dispersed in the first part and another portion of the nickel nanostrands may be dispersed in the second part, such as when the resulting electrically conductive adhesive includes a relatively high volume percent of nickel nanostrands (e.g., greater than about 10 volume percent nickel nanostrands). Disposing a portion of the nickel nanostrands in the first part and another portion of the nickel nanostrands in the second part may provide greater wetting of surfaces and mixing of the nickel nanostrands in each of the first part and the second part.

Each of the first part and the second part may include between about 0 percent and about 100 percent of the nickel nanostrands, such as between about 0 percent and about 20 percent, between about 20 percent and about 40 percent, between about 40 percent and about 60 percent, between about 60 percent and about 80 percent, or between about 80 percent and about 100 percent of the nickel nanostrands of the resulting electrically conductive adhesive.

The nickel nanostrands may constitute between about 10 weight percent and about 70 weight percent of one or both of the first part and the second part, such as between about 10 weight percent and about 30 weight percent, between about 30 weight percent and about 50 weight percent, or between about 50 weight percent and about 70 weight percent of one or both of the first part and the second part.

In some embodiments, at least one of the first part and the second part may further include an additional conductive filler. The additional conductive filler may include one or more of silver-coated microspheres, nickel-coated microspheres, silver-plated aluminum, nickel-coated graphite, silver-plated copper, silver-plated nickel, or other suitable electrically conductive filler material. In some embodiments, the additional conductive filler includes silver microspheres. Each of the first part and the second part may include the additional electrically conductive filler. In other embodiments, one of the first part and the second part includes the additional electrically conductive filler and the other of the first part and the second part includes the nickel nanostrands.

It is contemplated that, at least in some embodiments, the precursor package may be provided in space, such as during a space mission. By way of nonlimiting example, a component of a space vehicle (e.g., an insulation tile or panel) may become damaged or dislodged during flight. In some such embodiments, one or more replacement components may be secured to the space vehicle during the space mission, such as prior to re-entry. As another example, one or more electrical components may be subject to EMI during flight. The electrically conductive adhesive may be formed from the precursor package and the electrically conductive adhesive may provide EMI shielding to the one or more electrical components during flight.

Although the electrically conductive adhesive has been described above as being used in a structure, such as a space vehicle, aerospace vehicle, or aircraft, in other embodiments, the electrically conductive adhesive may be used in electronic applications as an alternative to solder. By way of nonlimiting example, the electrically conductive adhesive may be used in electrical systems where heat from solder application may damage electrical components of the electrical system.

EXAMPLES

Example 1

Electrically conductive adhesives formulated according to the methods described herein were tested against conventional electrically conductive adhesives in lightning strike tests. An electrically conductive adhesive including about 70 parts by weight bisphenol-F epoxy resin, 30 parts by weight resorcinol diglycidyl ether monomer, about 5 parts by weight ACCELERATOR® 399 curing promoter, about 31 parts by weight JEFFAMINE® D230, about 15.5 parts by weight JEFFAMINE® D400, and about 216 parts by weight nickel nanostrands was formed.

The electrically conductive adhesive including nickel nanostrands was placed between a carbon composite panel and a metallic fastener (e.g., an aluminum end ring), such as would be used to couple adjacent composite panels of, for example, a cylindrical rocket case. The panel was subjected to a simulated direct lightning strike. Commercially available electrically conductive adhesives were also disposed between carbon composite panels and a metallic fastener and exposed to a simulated direct lightning strike of substantially the same magnitude.

After the simulated direct lightning strike, the electrically conductive adhesive including the nickel nanostrands was the only electrically conductive adhesive providing a bond line that remained intact. The commercially available electrically conductive adhesives delaminated from at least one of the carbon composite panel and the metallic fastener. Accordingly, the electrically conductive adhesive including the nickel nanostrands exhibited improved adhesion strength and performance after a direct lightning strike compared to conventional electrically conductive adhesives.

Example 2

An adhesion strength of the electrically conductive adhesive including nickel nanostrands was compared to an adhesion strength of commercially available electrically conductive adhesives. The adhesion strength was measured using a tensile butt test, wherein the electrically conductive adhesive was disposed between two composite materials that were pulled apart at a rate of about 0.5 inch per minute (ipm) until the electrically conductive adhesive between the composite materials failed. The bond line in each case was about 7 mils.

The electrically conductive adhesive including the nickel nanostrands exhibited a substantially greater tensile adhesion strength than conventional electrically conductive adhesives, while also exhibiting an electrical resistivity lower than the conventional electrically conductive adhesives, as illustrated in Table I below. The electrically conductive adhesive with the nickel nanostrands had the same composition of the electrically conductive adhesive including nickel nanostrands described above with reference to Example 1.

TABLE I

| Formulation | Electrical Resistivity | TA Strength |
|---|---|---|
| Adhesive with Nickel Nanostrands | 0.0027 Ω · cm | 6352 psi |
| Conventional Adhesive 1 | 0.0446 Ω · cm | 5164 psi |
| Conventional Adhesive 2 | 0.0326 Ω · cm | 1565 psi |
| Conventional Adhesive 3 | 0.0171 Ω · cm | 1294 psi |

Example 3

A tensile strength and an electrical resistivity of different formulations of the electrically conductive adhesive including nickel nanostrands were measured at a bond line thickness of about 30 mils. In some embodiments, the electrically conductive adhesive further included an additional conductive co-filler (electrically conductive silver microspheres) dispersed therein. The test results are reproduced in Table II below, wherein percents are in volume percent of the resulting electrically conductive adhesive. The adhesive matrix material was a urethane in formulations 1 through 4 and the adhesive matrix material was an epoxy in formulations 5 through 12. The composition of formulations 1 through 4 are reproduced in Table III and the composition of formulations 5 through 12 are reproduced in Table IV below:

TABLE II

| Formulation | Nickel Nanostrands | Co-filler | Electrical Resistivity | TA Strength |
|---|---|---|---|---|
| 1 | 2% | 15% | 0.1562 Ω · cm | 208 psi |
| 2 | 6% | 15% | 0.1072 Ω · cm | 261 psi |
| 3 | 10% | 15% | 0.0184 Ω · cm | 281 psi |
| 4 | 15% | 15% | 0.0453 Ω · cm | 565 psi |
| 5 | 2% | 15% | 0.2422 Ω · cm | 6490 psi |
| 6 | 6% | 15% | 0.0195 Ω · cm | 4695 psi |
| 7 | 10% | 15% | 0.0061 Ω · cm | 4768 psi |
| 8 | 15% | 15% | 0.0036 Ω · cm | 5200 psi |
| 9 | 6% | 15% | 0.0298 Ω · cm | 7692 psi |
| 10 | 2% | 0% | 0.1500 Ω · cm | 8649 psi |
| 11 | 6% | 0% | 0.0066 Ω · cm | 7327 psi |
| 12 | 10% | 0% | 0.0052 Ω · cm | 6207 psi |
| Conventional | 0% | 0% | 0.00101 Ω · cm | 2009 psi |

The composition of formulations 1 through 4 are reproduced in Table III below, wherein values are reported in parts by weight.

TABLE III

| Formulation | Nickel Nanostrands | Co-filler | DDI | 1,4-Butane Diol | JEFFOL® G30-650 |
|---|---|---|---|---|---|
| 1 | 23.5 | 25 | 100 | 7 | 14 |
| 2 | 72.6 | 25 | 100 | 7 | 14 |
| 3 | 126.4 | 25 | 100 | 7 | 14 |
| 4 | 202 | 25 | 100 | 7 | 14 |

The composition of formulations 5 through 12 are reproduced in Table IV below, wherein the values are reported in parts by weight. The curing agent included about 1 part JEFFAMINE® D400 for every about 2 parts JEFFAMINE® D230 (i.e., about 15.5 parts by weight JEFFAMINE® D400 and about 31 parts by weight JEFFAMINE® D230).

TABLE IV

| Formulation | Nickel Nanostrands | Co-filler | Bisphenol-F | Resorcinol | Curing Agent | ACCELERATOR® 399 |
|---|---|---|---|---|---|---|
| 5 | 25.2 | 26.5 | 70 | 30 | 46.5 | 5 |
| 6 | 77.9 | 26.5 | 70 | 30 | 46.5 | 5 |
| 7 | 135.5 | 26.5 | 70 | 30 | 46.5 | 5 |
| 8 | 216 | 26.5 | 70 | 30 | 46.5 | 5 |
| 9 | 77.9 | 65.9 | 70 | 30 | 46.5 | 5 |
| 10 | 25.2 | 0 | 70 | 30 | 46.5 | 5 |
| 11 | 77.9 | 0 | 70 | 30 | 46.5 | 5 |
| 12 | 135.5 | 0 | 70 | 30 | 46.5 | 5 |

While the disclosure is susceptible to various modifications and alternative forms, specific embodiments have been shown by way of example in the drawings and have been described in detail herein. However, the disclosure is not intended to be limited to the particular forms disclosed. Rather, the disclosure is to cover all modifications, equivalents, and alternatives falling within the scope of the disclosure as defined by the following appended claims and their legal equivalents.

What is claimed is:

1. An assembly, comprising:
a first article;
a second article adjacent the first article; and
an electrically conductive adhesive comprising nickel nanostrands dispersed in a matrix comprising a reaction product of a diglycidyl ether of bisphenol-F epoxy resin, resorcinol diglycidyl ether epoxy monomer, and at least one amine-containing curing agent wherein the electrically conductive adhesive is in electrical communication with the first article and the second article wherein the reaction product comprises the following structure:

wherein the electrically conductive adhesive exhibits a tensile adhesion strength greater than about 5,000 psi and a volume resistivity less than about 0.01 Ω·cm.

2. The assembly of claim 1, wherein the electrically conductive adhesive comprises between about two volume percent and about fifteen volume percent nickel nanostrands.

3. The assembly of claim 1, wherein the electrically conductive adhesive further comprises another electrically conductive filler dispersed in the matrix.

4. The assembly of claim 1, wherein the electrically conductive adhesive exhibits a tensile adhesion strength greater than about 6,000 psi.

5. The assembly of claim 1, wherein the electrically conductive adhesive exhibits a volume resistivity less than about 0.005 Ω·cm.

6. The assembly of claim 1, wherein at least one of the first article and the second article comprises a thermally insulative composite material.

7. The assembly of claim 1, wherein at least one of the first article and the second article comprises an electrically conductive metallic mesh or an electrically conductive nonwoven material.

8. The assembly of claim 1, wherein at least one of the first article and the second article comprises a bond strap and wherein the bond strap electrically connects the other of the first article and the second article to a third article.

9. The assembly of claim 1, wherein the first article and the second article each comprise a thermally insulative, electrically conductive material.

10. The assembly of claim 1, wherein the electrically conductive adhesive further comprises one or more conductive fillers selected from the group consisting of silver-coated microspheres, nickel-coated microspheres, silver-plated aluminum, nickel-coated graphite, silver-plated copper, silver-plated nickel, and combinations thereof.

11. The assembly of claim 1, wherein the electrically conductive adhesive further comprises silver-coated ceramic spheres or silver-coated glass spheres.

12. The assembly of claim 1, wherein the electrically conductive adhesive comprises between about 1 part and about 5 parts of the diglycidyl ether of bisphenol-F epoxy resin per 1 part of the resorcinol diglycidyl ether epoxy monomer.

13. The assembly of claim 1, wherein the first article and the second article each comprise a portion of a space vehicle, an aerospace vehicle, or an aircraft.

14. The assembly of claim 1, wherein the first article is secured to the second article with at least one fastener selected from the group consisting of a clevis fastener, a bolt, and a nut, the electrically conductive adhesive in electrical communication with each of the first article, the second article, and the at least one fastener.

15. An assembly including an electrically conductive adhesive, comprising the assembly comprising:
a first article and a second article; and
an electrically conductive adhesive comprising between about two volume percent and about fifteen volume percent nickel nanostrands dispersed within an adhesive matrix material, the adhesive matrix material comprising:
a reaction product of a diglycidyl ether of bisphenol-F epoxy resin and resorcinol diglycidyl ether epoxy monomer and at least one amine curing agent wherein the reaction product comprises the following structure:

wherein the electrically conductive adhesive exhibits a tensile strength greater than about 5,000 psi and a volume resistivity less than about 0.01 Ω·cm.

16. The assembly of claim 15, wherein the electrically conductive adhesive exhibits a tensile adhesion strength of at least about 6,000 psi.

17. The assembly of claim 15, wherein the adhesive matrix material comprises about ten volume percent nickel nanostrands dispersed therein.

18. The assembly of claim 15, wherein the at least one amine curing agent comprises a polyetheramine.

19. The assembly of claim 15, further comprising silver-coated microspheres dispersed within the adhesive matrix material.

20. The assembly of claim 15, wherein the electrically conductive adhesive comprises:
about fifteen volume percent of the nickel nanostrands; and
between about two and about three parts diglycidyl ether of bisphenol-F epoxy resin per one part resorcinol diglycidyl ether epoxy monomer.

21. The assembly of claim 15, wherein the adhesive matrix material comprises about 7 parts by weight of the diglycidyl ether of bisphenol-F epoxy resin for every about 3 parts by weight of the resorcinol diglycidyl ether epoxy monomer.

22. The assembly of claim 15, wherein the electrically conductive adhesive exhibits a density less than about 2.5 g/cm$^3$.

23. A method of forming an assembly, the method comprising:
providing at least a first article and at least a second article adjacent to the first article; and
disposing an electrically conductive adhesive comprising nickel nanostrands dispersed in a matrix comprising a reaction product of a diglycidyl ether of bisphenol-F epoxy resin, resorcinol diglycidyl ether epoxy monomer, and at least one amine-containing curing agent wherein the reaction product comprises the following structure:

and exhibiting a tensile adhesion strength greater than about 5,000 psi and a volume resistivity less than about 0.01 Ω·cm between a surface of the first article and a surface of the second article to electrically interconnect the first article and the second article.

24. The method of claim 23, further comprising selecting at least one of the at least a first article and the at least a second article to comprise at least one of a composite material, a ground strip, or a bond strap.

* * * * *

UNITED STATES PATENT AND TRADEMARK OFFICE
CERTIFICATE OF CORRECTION

PATENT NO. : 9,963,619 B2
APPLICATION NO. : 14/951376
DATED : May 8, 2018
INVENTOR(S) : Robert S. Larson It is certified that error appears in the above-identified patent and that said Letters Patent is hereby corrected as shown below:

In the Specification

Column 5, Line 24, change "about 100 such" to --about 100 μm such--

In the Claims

Claim 15, Column 16, Line 41, change "adhesive, comprising the assembly" to --adhesive, the assembly--

Signed and Sealed this
Thirty-first Day of July, 2018

Andrei Iancu
*Director of the United States Patent and Trademark Office*